United States Patent [19]

Chevalier et al.

[11] 3,790,768

[45] Feb. 5, 1974

[54] RANDOM NUMBER GENERATOR

[75] Inventors: Paul Chevalier; Claude Ménard, both of Montreal; Bertrand Dorval, Quebec, all of Canada

[73] Assignee: Prayfel Inc., Montreal, Quebec, Canada

[22] Filed: Sept. 28, 1972

[21] Appl. No.: 292,861

[52] U.S. Cl. .................................. 235/152, 331/78
[51] Int. Cl. .............................................. G06f 7/00
[58] Field of Search ......................... 235/152; 331/78

[56] References Cited

UNITED STATES PATENTS 3,706,941 12/1972 Cohn .................................... 331/78

FOREIGN PATENTS OR APPLICATIONS 211,163 4/1968 U.S.S.R. ................................ 331/78

OTHER PUBLICATIONS

R. J. Harding, "Generation of Random Digital Numbers with Specified Probability Distribution," The Radio & Electronic Engineer, June 1968, pp. 369–375.

*Primary Examiner*—Malcolm A. Morrison
*Assistant Examiner*—David H. Malzahn

[57] ABSTRACT

A method of generating random numbers which comprises sampling, in a random manner, a pseudo-random generator. The random number generator comprises a pseudo-random number generator for generating pseudo-random numbers, a synchronous random pulse generator for generating synchronous random pulses and sampling means for sampling a pseudo-random number, the sampling being done at each instance one of the synchronous random pulses is generated, whereby to generate an output random number.

12 Claims, 5 Drawing Figures

RANDOM NUMBER GENERATOR

BACKGROUND OF INVENTION

1. Field of the Invention

The present invention relates to a random digital number generator. An important application of the present invention is the generation of random numbers having a uniform distribution function in the interval $[0,(2^n-1)]$, where $n$ is the number of bits in the random number. It is also possible to separately consider each of the bits of the random numbers; and there is therefore obtained in mutually independent random bits. Furthermore, these random bits are generated in accordance with a sequence controlled by a clock signal. More specifically, there is obtained, in a synchronized manner by means of the clock, a group of $n$ random bits which are independent of each other and also independent from the preceding random bits. Still further, each of these bits can be representative of a 0 or a 1 with a probability equal to ½. These two statistics (independent bits and probability equal to ½) and the high speed to which these random bits are generated, constitute the principal features of the random number generator of the present invention.

2. Description of Prior Art

There is heretofore known two types of random number generators which are presently being utilized and these are generators known as "pseudo-random" and "true random" generators. The pseudo-random generators generate a new number starting from an initial number by means of a predetermined algorithm. By applying successively the same algorithm on the last number generated, there is obtained a sequence of numbers which are all predetermined by the chosen algorithm and the initial number. Thus there is obtained with a very good approximation, one sequence of random numbers which are mutually independent and uniformly distributed in a given interval. The disadvantage of this method is that it is difficult to obtain a plurality of mutually independent sequences.

A true random generator usually utilizes a pulse generator (random or periodic but asynchronous with a clock) feeding a toggle flip-flop which changes its state at each pulse that it receives and a further flip-flop which samples the first flip-flop during a transition of the clock. Seeing that the output of the first flip-flop is as often in its state representative of a 0 than a 1, there is obtained at the output of the second flip-flop a signal having a probability equal to ½. Furthermore, provided that the frequency of the clock signal is smaller than that of the pulse generator, each of the samples is independent from the others. A major disadvantage of this type of generator is that seeing that the frequency of the clock signal is lower than that of the pulse generator, the rhythm at which the random bits are generated is relatively low. Furthermore, seeing that the pulse generator and the clock are asynchronous, there is a certain probability that the second flip-flop will sample the first flip-flop while changing its state. The output of the sampler is therefore undetermined and can introduce a bias on this probability by favouring one of the logic levels.

SUMMARY OF INVENTION

The advantages of the present invention over the prior art devices mentioned above are derived from the fact that it utilizes a method which consists in sampling a pseudo-random number by means of a true random signal. The sequence of random numbers obtained at the output of the random number generator is thus a sub-sequence extracted from a sequence of pseudo-random numbers. Consequently, the distribution function of the output numbers is similar to the distribution function of the pseudo-random numbers. We can thus generate random numbers having statistical qualities which are at least as good as those of pseudo-random numbers. Furthermore, because the phase of the pseudo-random number generator as well as the instant at which it is sampled are made random, it is possible to utilize simultaneously many random number generators and obtain as many sequences of random numbers mutually independent.

A further important feature of the present invention is derived from the fact that we obtain a new random number for each synchronous random pulse generated by the synchronous random pulse generator. This makes it possible to obtain random bits or numbers at a rhythm which is much higher than the prior art system which utilizes the pulse generator with the flip-flop arrangement, as discussed hereinabove.

Accordingly, from a broad aspect, the present invention provides a random number generator comprising a pseudo-random number generator for generating pseudo-random numbers. Synchronous pulse generator is further provided for generating said synchronous random pulses. Sampling means are also provided for sampling a pseudo-random number at each instance one of said synchronous random pulses is generated to generate an output random number having a uniform distribution function.

From a still further aspect, the present invention provides a method of generating random numbers which consists in sampling in a random manner a pseudo-random number generator.

BRIEF DESCRIPTION OF THE DRAWINGS

A preferred embodiment of the present invention will now be described with reference to the accompanying drawings in which.

DESCRIPTION OF PREFERRED EMBODIMENTS

Figure 1:
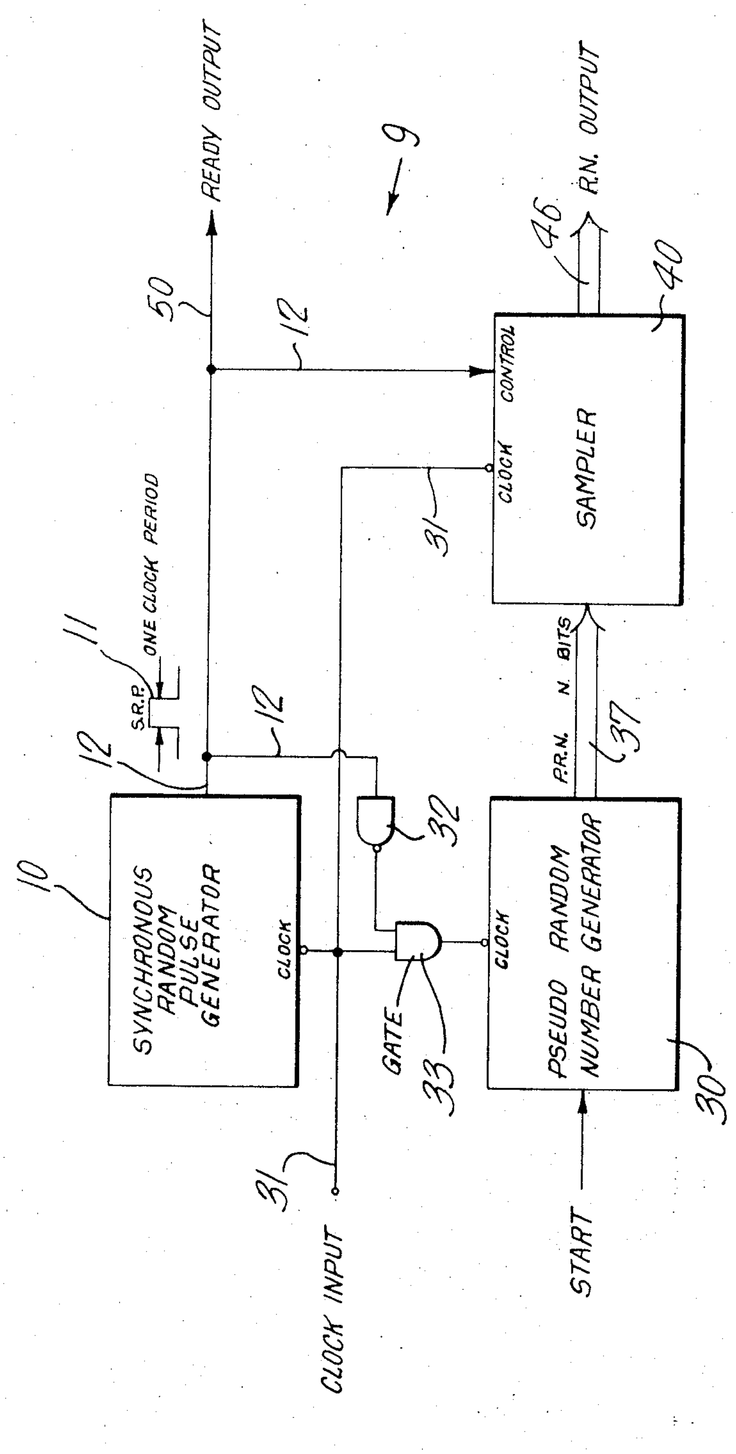
FIG. 1 is a block diagram of the random number generator of the present invention.

Referring now to the drawings, it will be seen that the present invention is realized practically exclusively by means of standard digital circuits. Referring to FIG. 1, there is shown the random number generator 9 of the present invention, as comprising a synchronous random pulse generator 10 which is a generator of random pulses having practically a Poisson distribution but which are synchronized by a central clock signal on input line 31 having a frequency which is higher than the mean frequency of the synchronous random pulses. The synchronous random pulses 11 are of a duration equal to the period of the clock and at each negative transition of the clock, there is a certain probability of obtaining a synchronous random pulse. At the output 12 there is thus generated synchronous random pulses 11 which are independent from their environment and in particular of other synchronous random pulse generators (not shown).

Figure 2:
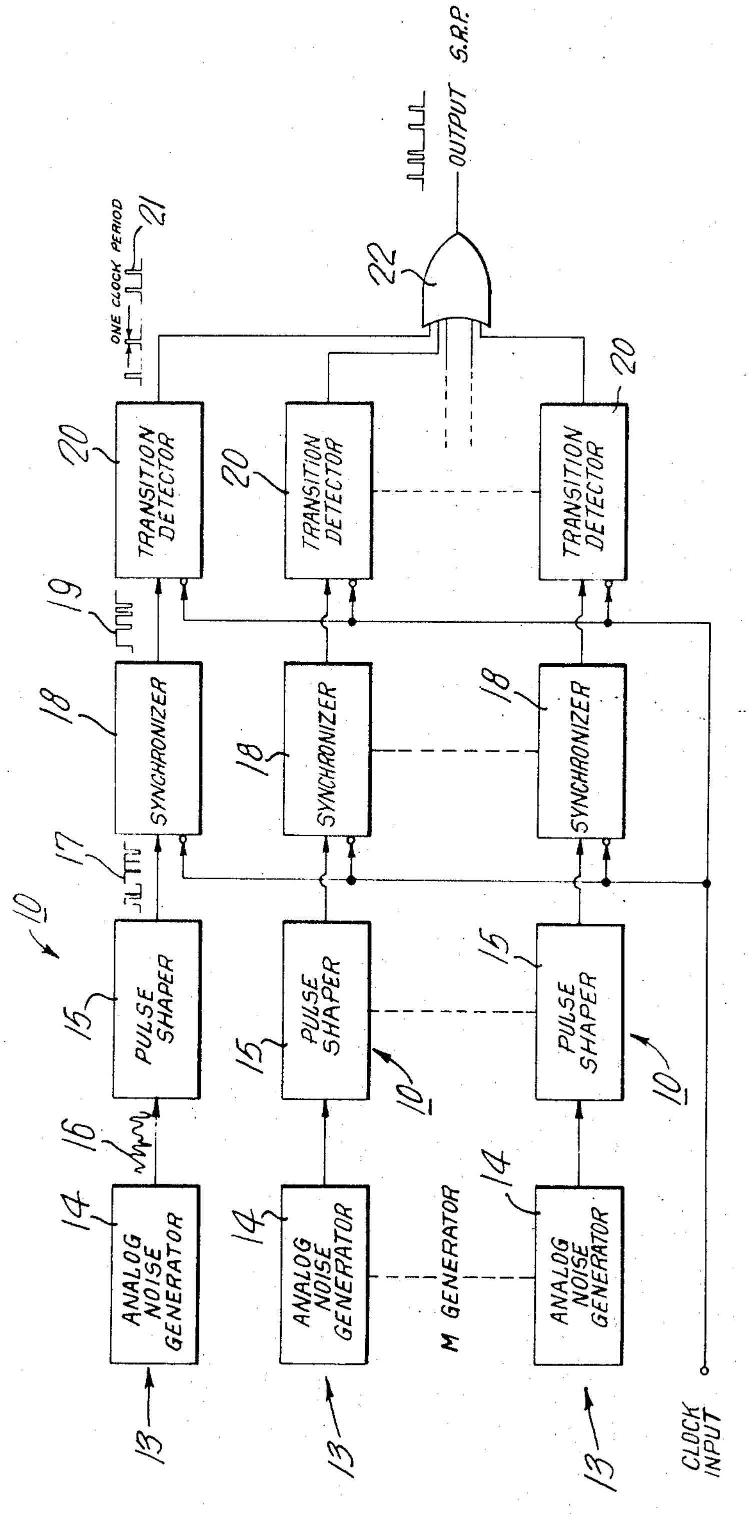
FIG. 2 is a block diagram of a synchronous random pulse generator.

As shown in FIG. 2, the synchronous random pulse generator 10 comprises an analog high frequency noise generator 14 which noise can be generated by a zener diode (not shown) which is back biased. This high frequency noise is firstly amplified and pulse shaped in a pulse shaper circuit 15 to be compatible with the digital circuits. Numeral 16 denotes the noise signal at the output of the analog noise generator 14. The output signal 17 from the pulse shaper 15 is then fed to a synchronizer 18 and the output signal 19 of the synchronizer 18 is then fed to a transition detector 20 which transmits pulses of duration equal to the period of the clock pulse and in synchronism with the clock pulse. These pulses are illustrated by numeral designation 21. As long as the frequency of the clock is higher than the mean frequency of the random pulses 17, it is possible to utilize many parallel series 13. Further, it is possible to sum the outputs of the transition detectors 20 in a gate 22. By utilizing this type of an arrangement, we obtain a synchronous random pulse generator 10 having higher mean frequency and at the same time of improved statistical quality.

Figure 3:
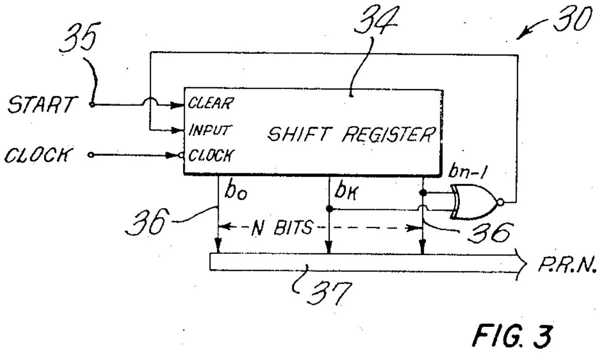
FIG. 3 is a circuit diagram of a pseudo-random number generator.

Referring again to FIG. 1, there is further shown that the random number generator 9 also utilizes a pseudo-random number generator 30 which generates pseudo-random digital numbers having a uniform distribution. The generator 30 operates at a rate in accordance with the frequency of the central clock on the input connection 31 and connected to the generators 10 and 30 and a sampler 40, which will be described later. However, a synchronous random pulse 11 inhibits the pseudo-random number generator 30 through the inverter 32 which connects to an input of the gate 33 and the generator 30. The clock pulse signal at 31 is also fed to an input of the gate 33 which is connected to the generator 30. The gating effect of pulse 11 on the clock pulse 31, by the gates 32 and 33, results in that the phase of the pseudo-random number generator 30 is random and it is therefore possible to utilize many pseudo-random number generators 30 as their phases are independent from one another. The generator 30 being utilized is shown in FIG. 3 and consists essentially of a shift register 34 and an invert exclusive OR gate. The values of $k$ and $n$ are selected in a manner to obtain a maximum length cycle. A start signal 35 is utilized to initialize the shift register 34 after it is switched on. The pseudo-random number 37 at the output of the pseudo-random number generator consists of $n$ output bits 36 of the shift register 34.

Figure 4:
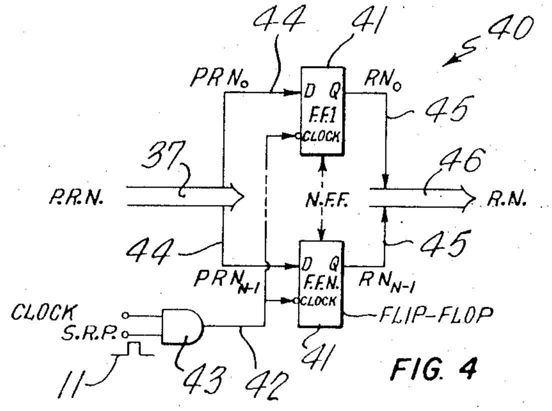
FIG. 4 is a circuit diagram of a first type of sampler utilized in the present invention.
Figure 5:
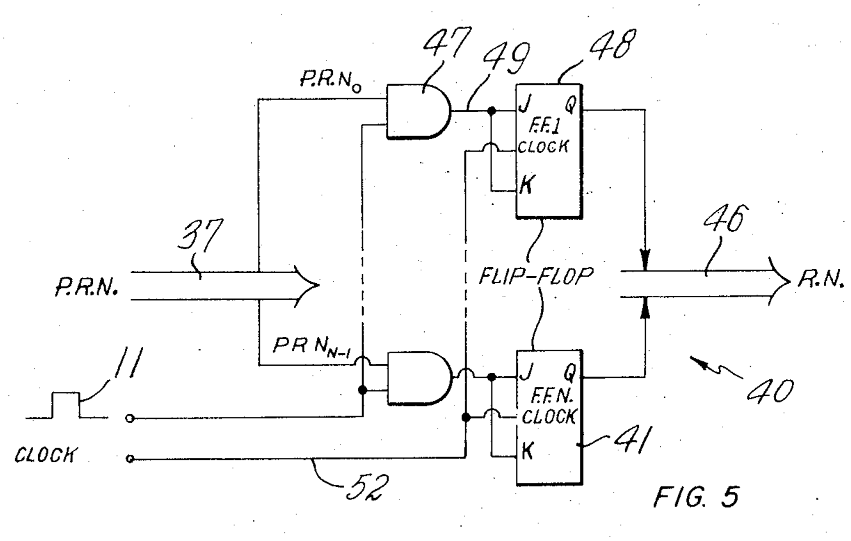
FIG. 5 is a circuit diagram of a second type of sampler utilized in the present invention.

Referring again to FIG. 1, the random number generator 9 further comprises a sampler 40 which is fed by the output signal of the generator 30 and which samples the pseudo-random number 37 at the instant of a negative transition of the clock signal which is fed on the input line 31, if and only if the synchronous random pulse generator 10 has produced a pulse 11 during the preceding negative transition of the clock. The present invention utilizes either of two types of samplers 40 and these are shown in FIGS. 4 and 5. Referring to FIG. 4, there is shown a first type of sampler 40. The sampler employs a plurality of "D" type flip-flops 41 being fed with the clock input pulse via connection 42 which is the output of a gate 43 to which the clock pulse and the synchronous random pulse 11 is fed. Each bit of the pseudo-random number signal 37 is also applied to an input of each of the flip-flops via connections 44. The outputs 45 from the flip-flops 41 produce the output random number 46. The bit $i$ of the random number 46 is given by the following Boolean equation.

$RNi\ (\tau+1) = \overline{SRP} \cdot RNi(\tau) + SRP \cdot PRNi(\tau)$. The passage $(\tau)$ to $(\tau+1)$ corresponds to the negative transition of the clock pulse, PRNi corresponds to the bit $i$ of the pseudo-random number and SRP is the output pulse 11 of the synchronous random pulse generator 10.

The second type of sampler 40 as shown in FIG. 5 comprises a plurality of JK flip-flops 48 to each of which is directly fed the clock signal via input connection 52. The synchronous random pulse 11 and the pseudo-random number 37 are fed to the inputs of gates 47, and the output 49 of each gate 47 is connected to the "J" and the "K" inputs of one of the J-K flip-flops 48. The outputs of the JK flip-flops 48 produce the random number 46 of the generator 9.

The bit $i$ of the random number 46 of the second type of sampler is given by the Boolean equation $$RNi(\tau+1) = \overline{SRP} \cdot RNi(\tau) + SRP \cdot [RN1(\tau) + PRN1(\tau)]$$

The second type of sampler 40 shown in FIG. 5 has the advantage that it reduces the dependence that can exist between successive random numbers 46.

To improve the statistical qualities of the random numbers, it is possible to electrically isolate the analog noise generator 14 (FIG. 2), the pulse shaper 15 and the synchronizer 18 from their environment. This can be done by placing these three circuits into a metal box and further filtering the power supply. Thus, it is possible to obtain at the output of the synchronizer 18 a random output signal 19 which is practically independent of its environment.

The utilization of various parallel series 13 improves the statistical qualities of the generator 10 by a relative spreading of the probability function of the time intervals between two synchronous random pulses 11. In particular, this will permit an increase of the mean frequency of the synchronous random pulse generator 10.

While the above refers to a random number generator having a uniform distribution, the same method could be used to generate random numbers having other distribution functions. The same random number generator, as described in FIG. 1, can be used, and it is only required that the pseudo-random number generator 30 has the desired distribution function.

It is obvious that the pseudo-random number generator 30 can be replaced by a true random number generator. This will result in a random number generator having improved statistical qualities.

In the present invention, the expression "pseudo-random number generator" includes all those devices which generate digital numbers in a determinate manner with the numbers satisfying one or more of the standard criteria for statistical randomness as, for example, counters using various codes, a single flip-flop giving one-bit numbers, shift registers, etc.

The random number generator 9 of the present invention does not generate a random number 46 at each clock pulse but each time that the synchronous random pulse generator 10 generates a synchronous random pulse 11. This pulse 11 can thus be considered as a second output of the random number generator 9 and utilized to signal that a new random number will be generated. The pulse signal 11 is thus fed to a "ready" output 50 for detection.

We claim:

1. A random number generator comprising a pseudo-random number generator for generating pseudo-random numbers, a synchronous random pulse generator for generating synchronous random pulses, and sampling means for sampling a pseudo-random number at each instance one of said synchronous random pulses is generated to generate an output random number having a uniform distribution function.

2. A random number generator as claimed in claim 1 wherein said synchronous random pulses are in synchronism with a clock pulse, said random number comprising a plurality of random bits independent from each other and also from the bits in preceeding random numbers.

3. A random number generator as claimed in claim 1 wherein said sampling means is a sampler comprising a plurality of flip-flops, each bit of said pseudo-random number being connected to an input of each said flip-flops, a clock pulse and said synchronous random pulse fed to a gate connected to a further input of said flip-flops to enable each said flip-flops each time a synchronous random pulse is received to produce said random number at their combined output.

4. A random number generator as claimed in claim 3 wherein said random number comprises a plurality of random bits, the bit $i$ of said random number is given by the Boolean equation $$RNi\ (\tau + 1) = \overline{SRP} \cdot RNi\ (\tau) + SRP \cdot RNi(\tau)$$

where $RNi(\tau)$: bit $i$ of said random number before the clock pulse $RNi(\tau+1)$: bit $i$ of said random number after the clock pulse SRP: output of said synchronous random pulse generator before the clock pulse PRNi($\tau$): bit $i$ of the output number of the pseudo-random number generator before the clock pulse.

5. A random number generator as claimed in claim 1 wherein said sampling means is a sampler comprising a plurality of J-K flip-flops having a common clock signal input, a gate connected to the J and K inputs of each said flip-flops, each said gates having been connected to said pseudo-random generator for receiving a pseudo-random number and to said synchronous random pulse generator for receiving a synchronous random pulse to enable each said flip-flops and to produce said random number at their combined output.

6. A random number generator as claimed in claim 5 wherein said random number comprises a plurality of random bits, the bit $i$ of said random number is given by the Boolean equation $$RNi(\tau + 1) = \overline{SRP} \cdot RNi(\tau) + SRP \cdot RNi(t)$$

where $RNi(\tau)$: bit $i$ of said random number before the clock pulse $RNi(\tau+1)$: bit $i$ of said random number after the clock pulse SRP: output of said synchronous random pulse generator before the clock pulse $PRNi(\tau)$: bit $i$ of the output number of the pseudo-random number generator before the clock pulse.

7. A random number generator as claimed in claim 1 wherein said synchronous random pulses are fed to a gate to stop in a random manner the pseudo random number generator to yield a random phase in the sequence of pseudo random numbers.

8. A random number generator as claimed in claim 1 wherein said synchronous random pulse generator comprises an analog noise generator generating a high frequency signal, a pulse shaper to amplify and place said high frequency signal on a given level, a synchronizer connected to said high frequency signal at said given level and producing output synchronous pulses and a transition detector connected to said synchronous pulses and transmitting pulses in synchronism with the clock pulses to produce said synchronous random pulses.

9. A random number generator as claimed in claim 8 wherein a plurality of said synchronous random pulse generators have their output connected in parallel to a summer circuit, said summer circuit being an OR gate which produces an output pulse each time a pulse is present at the output of any one of said synchronous random pulse generators.

10. A random number generator as claimed in claim 1 wherein said output random number is a bit.

11. A random number generator as claimed in claim 1 wherein said pseudo-random number generator comprises a single toggle flip-flop which changes its state at each clock pulse it receives, the output of this toggle flip-flop being the output of the pseudo-random number generator thus obtaining a one bit pseudo-random number.

12. A method of generating random numbers comprising generating a sequence of pseudo-random numbers synchronously with a clock, generating a sequence of random pulses which occur randomly in time but are synchronized with the said clock, and sampling and storing one of said pseudo-random numbers each time said random pulse occurs to obtain a random number.

* * * * *